Aug. 28, 1956  H. D. UNDERWOOD  2,760,685
SELF-PROPELLED PRIME MOVER ACTUATED MATERIAL SPREADER
Filed May 28, 1954  2 Sheets-Sheet 1
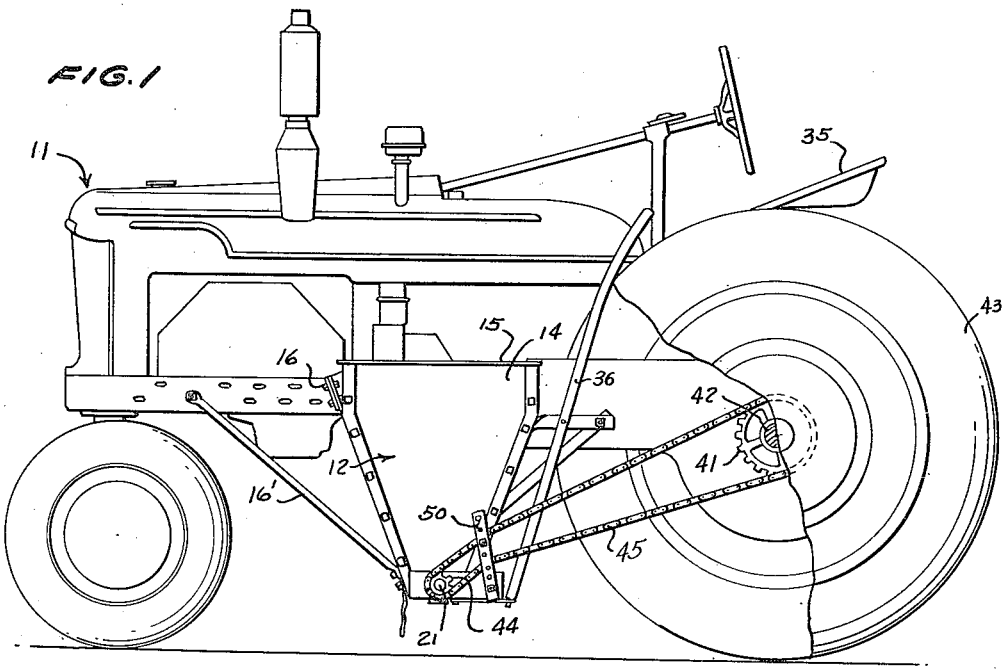
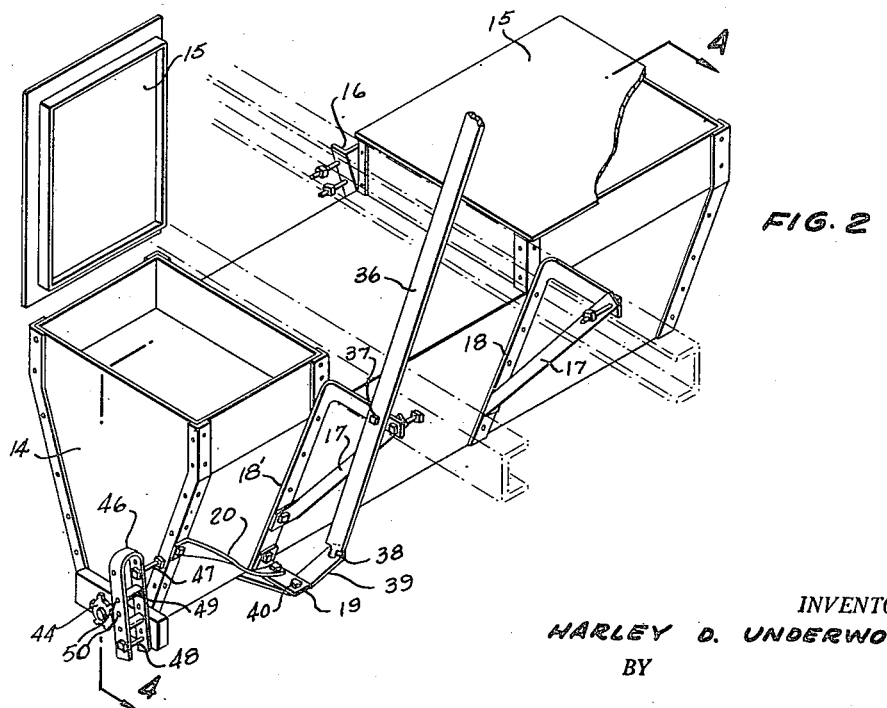
INVENTOR.
HARLEY D. UNDERWOOD
BY
McMorrow, Berman & Davidson
ATTORNEYS Aug. 28, 1956  H. D. UNDERWOOD  2,760,685
SELF-PROPELLED PRIME MOVER ACTUATED MATERIAL SPREADER
Filed May 28, 1954  2 Sheets-Sheet 2
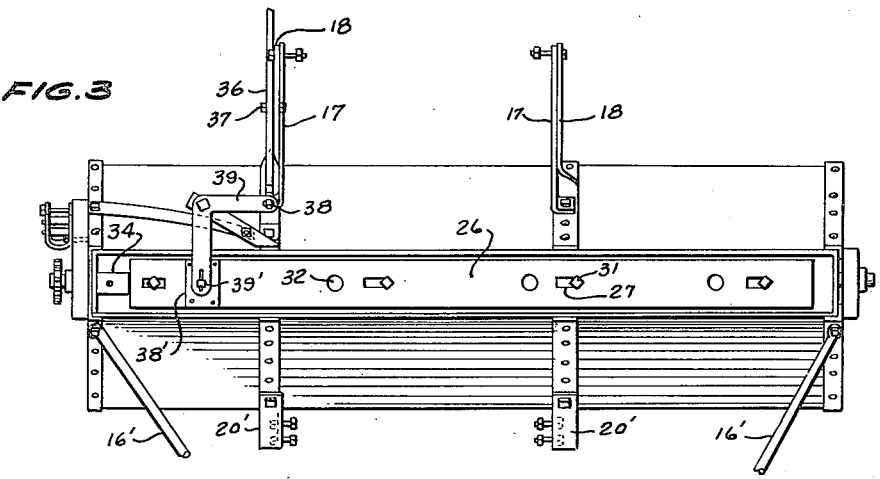
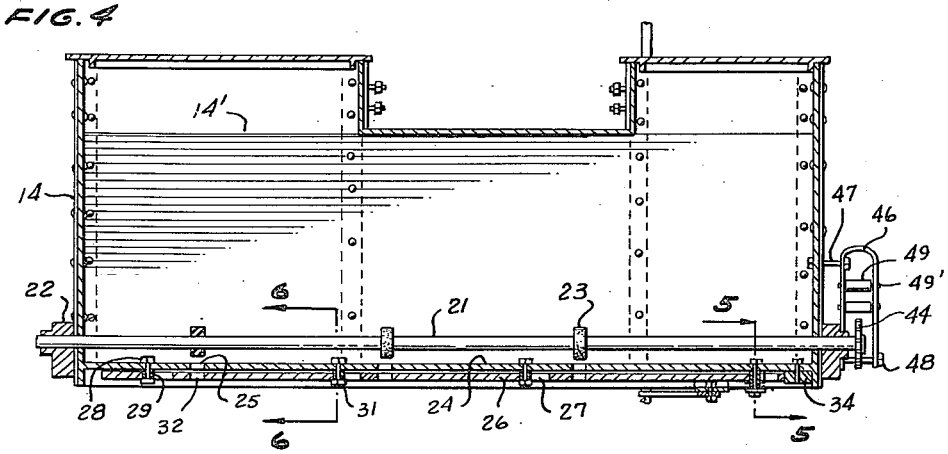
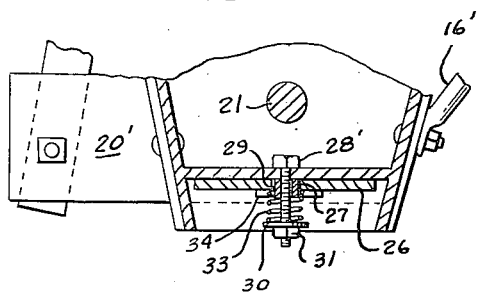
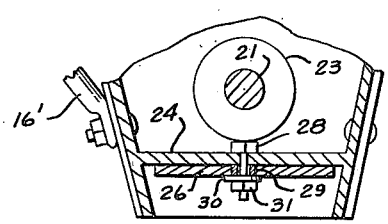
INVENTOR.
HARLEY D. UNDERWOOD
BY
McMorrow, Berman & Davidson
ATTORNEYS

United States Patent Office 2,760,685
Patented Aug. 28, 1956

2,760,685

SELF-PROPELLED PRIME MOVER ACTUATED MATERIAL SPREADER

Harley D. Underwood, Metcalf, Ill.

Application May 28, 1954, Serial No. 433,085

1 Claim. (Cl. 222—177)

This invention relates to a self-propelled, prime mover-actuated material spreader and has as a particular object the provision of such a spreader adapted to have degree of material delivery controlled from the seat of the driver on the prime mover.

Another object of the invention is to provide a material spreader having novel and positively regulated means for controlling the rate of material delivery from the material bin.

It is also an object of this invention to provide a material spreader in which the rate of material agitation adjacent the material bin delivery ports is a function of prime mover speed.

It is another object of this invention to provide an inexpensive material spreader comprising spreader parts easily connected to various types of prime movers, as tractors, without requiring substantial adaptation for installation.

A further object of the invention is to provide a material spreader having means to regulate the tension of the driving engagement between the prime mover and the material agitating shaft.

Other and further objects and advantages of the invention will become apparent from a study of the following specification, taken in connection with the accompanying drawings wherein like characters of reference designate corresponding parts throughout the views and wherein:

Figure 1 is an elevation of an embodiment of the invention.

Figure 2 is a perspective view of the material spreader and of its means of connection to the prime mover.

Figure 3 is a bottom view of the material spreader.

Figure 4 is a longitudinal sectional elevation of the material spreader taken along line 4—4 of Figure 2.

Figure 5 is a fragmentary transverse sectional elevation taken along line 5—5 of Figure 4.

Figure 6 is a fragmentary transverse sectional elevation taken along line 6—6 of Figure 4.

Referring in detail to the figures, a prime mover or tractor 11, as shown in Figure 1, has mounted thereon a material spreader 12 as for spreading fertilizer. Such spreader has as an essential element a bin 14 which extends on each side of and beneath the tractor or prime mover 11 as best seen in Figure 2. Doors 15 are accessible on either side of the tractor 11 through which material may be supplied into the bin 14. Forwardly the bin is connected to the frame of the tractor, as by clip angles 16, and braces 16' and rearwardly by the straps 17 and brackets 18 and 18'. The bracket 18' has extending therefrom on one side the toe 19 which is supported from the side of the bin 14 by a strap 20, for purposes to be hereinafter described. Straps 20' connect the bottom of the bin 14 to the prime mover as shown in Figure 3.

The bin 14 has the shaft 21 journalled therein, and in bearings 22 mounted on either side of the bin, as shown in Figure 4. Spaced along the shaft 21 are agitators 23, such as wheels, to agitate and stir the material in the bin, as fertilizer 14'. The bottom of the bin comprises a plate 24 which provides holes 25 therein spaced preferably adjacent to or under the agitator wheels 23. A plate 26, as best shown in Figures 3 and 4, has slots 27 therein. Bolts 28 have heads which bear within the bottom of the bin and these bolts extend downwardly therethrough and through bushings 29 in slots 27 in the plate 26, such bushings being of greater height than the thickness of the plate 26. A washer 30 and nut 31 on the bolts 28, as shown in Figure 6, provide bearing support for the plate 26 and bushings 29. Spaced from the slots 27 and adjacent thereto are holes 32 in the plate 26. Movement of the plate 26 with relation to the bottom plate 24 of the bin, as the slots 27 slide by the bushings 29, will bring the holes 32 into partial coincidence with the holes 25, or into full coincidence therewith as seen in Figure 4.

Toward one end of the bin 14 a longer bolt 28' extends through a bushing 29 in a slot 27 and at this end the plate 26 is urged upwardly by the spring 33 which bears downwardly on the washer 30 and upwardly against such plate 26 to frictionally tension the end of the plate 26 against the bottom plate 24 of the bin 14 at this end. At such end a stop block 34 is affixed to the bottom plate 24 against which the plate 26 bears endwardly at the end of rightward travel, as shown in Figure 4.

In order to adjust from the position of the operator in the seat 35, the travel or positioning of the plate 26 with relation to the bottom plate 24 so as to thereby control the degree of coincidence between the holes 25 and the holes 32, a lever 36 is pivotally connected to a bellcrank lever 39 which is pivotally connected at 40 to the toe 19. This bellcrank lever 39 extends beneath the plate 26 and is pivotally connected at 39' to the connection block 38' which is rigidly connected to plate 26 as a part thereof. It can thus be seen that a forward thrust on the upper end of the lever 36 will move the plate 26 away from the stop block 24, while a rearward pull on the top of such lever 36 will move the plate toward and into stopping contact with such stop block, thereby bringing holes 25 and 32 into full coincidence.

In order to rotate the shaft 21 so that the agitator wheels 23 may stir the material to be spread and urge it through the coinciding holes 25 and 32, a driving connection between the propulsion means of a tractor and such shaft is established by installing a pulley or chain gear 41 on the rear axle 42, on which is mounted the rear traction wheel 43, and by installing a pulley or chain pinion 44 on the shaft 21, and connecting the gear and pinion for driving engagement by the driving chain 45. By this arrangement the agitator shaft 21 is rotated in direct proportion to the rotation of the wheel 43, with the consequence that the faster the tractor 11 travels the faster will be the rotation and the greater the agitation effected by the shaft 21.

In order to regulate the tension in the chain 45 a yoke 46 is mounted by means of the bolts 47, 48 to the bin 14 and idler rollers 49 are mounted within the yoke and to bear upon the chain 45 with the desired degree of tension. Thus by mounting of roller shafts 49' on which the rollers 49 rotate in the various yoke holes 50 the desired of chain tightness may be obtained.

This invention has particular demand on farms for the distribution of fertilizer and is employable for the spreading of a vast variety of other materials as well. The spreader construction is simple and easily installable on conventional tractors of various widths, as the attaching braces and parts are subject to transverse and longitudinal adjustment without alteration of the chassis of the prime mover. It is only necessary to make bolted connection to the tractor body at a very few points and adjustment for tractor width variation can then be made by the addition of nuts, shims, and spacers upon the connecting bolts.

Also, the material spreader attachment embodying this invention would be extremely efficient in preparing the soil for planting in that the fertilizer and other materials can be plowed under by suitable plowing attachments secured to the tractor 11 at the same time the material is spread.

It is believed that many advantages of a material spreading machine constructed in accordance with the present invention will be readily understood and although a preferred embodiment of apparatus is as illustrated and described it is to be understood that changes in the details of construction and arrangement of parts may be resorted to which will fall within the scope of the invention as claimed and broadly merited.

What is claimed is:

In a self-propelled prime mover actuated material spreader the combination of a material bin connected to said prime mover extending transversely thereof and projecting from opposite sides of the prime mover, a shaft journalled in said bin and extending therefrom, material agitator means spaced along said shaft within said bin, tension adjustment means establishing a driving engagement between the propulsion means of said prime mover and said shaft externally of said bin, said bin providing opening means in the bottom thereof through which material may drop, a plate providing opening means therein and slidably mounted for movement longitudinally with relation to said bottom in underlying relation thereto, a bell crank lever pivotally mounted centrally thereof to said bin and pivotally connected at one end to said plate, and a lever accessible at one end for operation from a driver's seat on the prime mover and pivotally mounted centrally on said prime mover and pivotally connected at the other end of said bellcrank lever whereby manipulation of said lever may bring the opening means of plate and bottom into coincidence to control material delivery from said bin, the bottom of said bin and the plate respectively including overlying apertured and longitudinal slot portions, a bolt assembly extending through the apertures and slot portions, and a coil spring circumposed on the bolt assembly frictionally urging the plate into engagement with the bottom of the bin.

References Cited in the file of this patent

UNITED STATES PATENTS

| | | |
|---|---|---|
| 2,161,701 | Dimick | June 6, 1939 |
| 2,232,825 | May | Feb. 25, 1941 |
| 2,549,126 | Pearson | Apr. 17, 1951 |
| 2,620,094 | Swenson | Dec. 2, 1952 |
| 2,678,145 | Juzwiak et al. | May 11, 1954 |
| 2,704,624 | Seltzer | Mar. 22, 1955 |